United States Patent [19]

Noack et al.

[11] Patent Number: 4,716,617
[45] Date of Patent: Jan. 5, 1988

[54] WINDSHIELD WIPER BEARING

[75] Inventors: Klauspeter Noack, Obersulm; Hans Prohaska, Bietigheim-Bissingen, both of Fed. Rep. of Germany

[73] Assignee: SWF Auto-Electric GmbH, Bietigheim-Bissingen, Fed. Rep. of Germany

[21] Appl. No.: 820,246

[22] Filed: Jan. 17, 1986

[30] Foreign Application Priority Data

Jan. 17, 1985 [DE] Fed. Rep. of Germany ....... 3501338

[51] Int. Cl.⁴ .............................................. B60S 1/02
[52] U.S. Cl. .................. 15/250.34; 384/271; 403/166; 403/265
[58] Field of Search ........................ 15/250.31–250.42; 384/246, 271, 272; 403/265, 266, 267, 258, 260, 261, 360, 166, 365

[56] References Cited

U.S. PATENT DOCUMENTS 2,620,503 12/1952 Boothby ....................... 15/250.34 X
4,550,469 11/1985 Deutscher et al. ............. 15/250.34

FOREIGN PATENT DOCUMENTS 1816835 1/1973 Fed. Rep. of Germany ... 15/250.31
106595 10/1923 Switzerland ....................... 384/271

*Primary Examiner*—Peter Feldman
*Attorney, Agent, or Firm*—James B. Raden; Robert P. Seitter

[57] ABSTRACT

A windshield wiper shaft is mounted in a bearing bushing, wherein the bearing bushing and the wiper shaft rest against each other with conical bearing surface portions to compensate for possible radial play. This is important in constructions in which the bearing bushing and the wiper shaft are injection-molded from plastics material.

19 Claims, 5 Drawing Figures

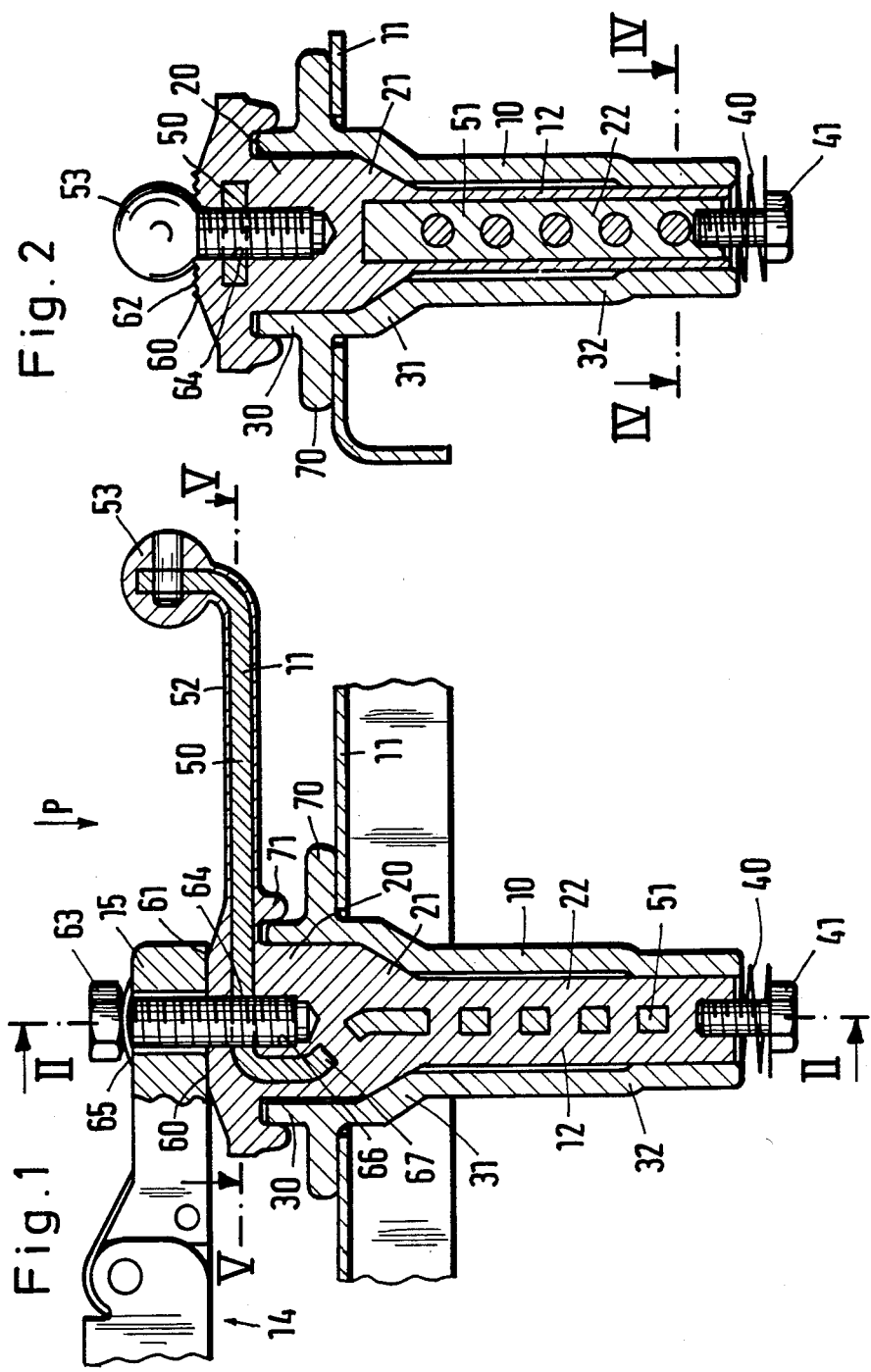

150 # WINDSHIELD WIPER BEARING

BACKGROUND OF THE INVENTION

The invention pertains to a windshield wiper system.

To save weight, plastic parts are increasingly used in wiper systems, such as, for example plastics bearing bushings as described in German Pat. No. 2,9911,155.

German OS No. 3,045,504 describes making the wiper shaft and the crank from plastic material as a single piece.

However experiments show that, due to the unavoidable shrinkage in the injection-molding process of such parts, the tolerances usually obtainable with metal parts cannot always be achieved with plastics parts. In particular when bearing bushings are made of plastic the radial play can become so great that increased noise results.

It is a problem to provide a wiper system having plastic parts in which the aforementioned radial play is eliminated.

SUMMARY OF THE INVENTION

The invention is thereby directed to reducing this radial play between the wiper shaft and the bearing bushing. In accordance with the invention, conical bearing surface portions are provided on the wiper shaft and bearing bushing which fittingly rest against each other. At least in the area of these conical bearing surface portions radial play is eliminated.

To ensure good engagement between these conical bearing surface portions over a long service time, the bearing bushing and the wiper shaft are resiliently urged against each other.

German specification OS No. 2,107,706, German petty Pat. No. 8,232,482 and British Pat. No. 1,071,565 include wiper bearings in which compensation for axial play between a bearing bushing and wiper shaft is achieved by spring means, however these known examples do not have conical bearing surface portions for eliminating the radial play.

Depending on the desired direction of mounting, the conical bearing surface portion can taper or widen towards the side of the wiper arm or towards the opposite side. In an especially preferred embodiment, the crank driving the wiper shaft will be fixed on the wiper shaft in a manner protected against twisting on that side towards which the conical bearing surface portion widens. Then according to an advantageous development of the invention the crank and the wiper shaft can be manufactured in one piece as a structural unit.

This structural unit is then advantageously fabricated in accordance with patent application P No. 33 47 441. The crank is punched out from a metal blank and is coated with an anticorrosive plastic layer. A ball pin is injection-molded onto the crank for articulating a push rod. This metallic crank is shaped and bent in such a way that a rectangularly projecting portion extends into the wiper shaft as a metal support thus increasing its stability.

In a preferred construction a cylindric portion of larger diameter projects beyond the crank and adjoins the conical bearing surface portion of the wiper shaft. The base of this cylindric portion can then serve as a bracing surface for the fastening member of a wiper arm, whereby great torques can be transmitted, because the area of the faces in contact with each other are relatively large.

BRIEF DESCRIPTION OF THE DRAWING

The invention will be better understood from a reading of the following detailed description in conjunction with the drawing in which:

FIG. 1 is a longitudinal section through a wiper bearing;
FIG. 2 is a section taken along the line II—II.

DETAILED DESCRIPTION

Figure 3:
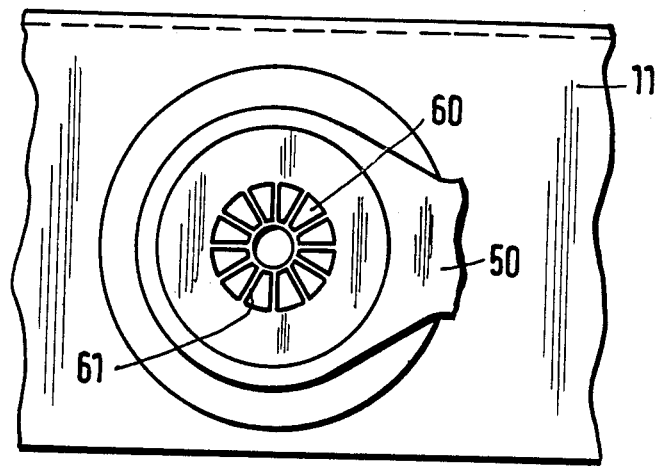
FIG. 3 is a partial view in the direction of arrow P.
Figure 4:
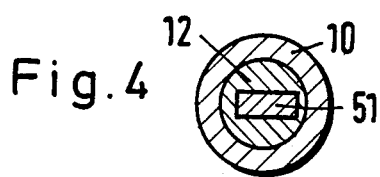
FIG. 4 is a section taken on the line IV—IV.
Figure 5:
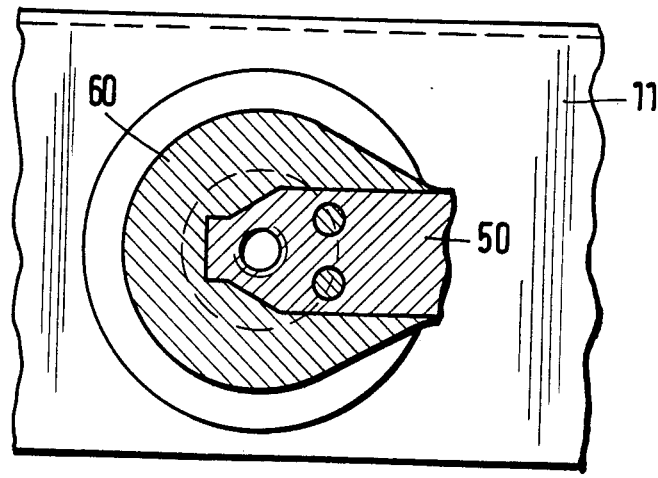
FIG. 5 is a partial section taken on the line V—V.

As shown in the drawing, a bearing bushing 10 is included in a wiper bearing of a wiper system. The bearing bushing is fastened on the body 11 of a vehicle. A wiper shaft 12 is rotatably guided in the bearing bushing 10. Wiper shaft 12 is driven by a crank 13. A wiper arm in known manner having a fastening member 15 is designated 14.

As seen in FIGS. 1 and 2 wiper shaft 12 has three portions with different diameters. At its end facing the wiper arm the wiper shaft 12 has a cylindrical portion 20 with a relativley large diameter. This portion 20 adjoins a conical portion 21 which widens towards the side of the wiper arm. A further cylindric portion 22 with a smaller diameter is substantially longer than portion 20 and extends nearly to the end of the bearing bushing 10.

Bearing bushing 10 which is injection-molded from plastic material also has three portions with different diameters, namely a portion 30 with large diameter, a conical portion 31 and a portion 32 with smaller diameter. Making the wall thickness of bearing bushing 10 substantially constant prevents different shrinkages of the plastic in the obvious areas which, in turn would result in unacceptable deviations in tolerances.

The conical portions 21 and 31 on the wiper shaft and on the bearing bushing 10, respectively, form bearing surfaces adapted to each other. These bearing surface portions 21 and 31 rest against each other free from play, because the bearing bushing 10 and the wiper shaft 12 are braced relative to each other in the axial direction by spring means 40. In the embodiment shown a helical spring is used as a spring means 40, which is supported on bearing bushing 10 and on the other hand on the head of a screw 41 which is screwed into the wiper shaft 12 at the side facing the wiper arm. The spring force is adjustable by means of screw 41. The spring 40 provides automatic adjustment in the case of wear, so that even after long service time little play appears between the wiper shaft 12 and bearing bushing 10. Consequently the wiper bearing works with little noise.

The present invention is of particular significance when the wiper shaft is also made of plastic material. In this case, the tolerances appearing in the injection-molding process of the wiper shaft can be compensated for. However the basic ideas of the invention can also be advantageously applied, if the bearing bushing and wiper shaft are made of metal in the conventional manner.

In the embodiment shown, wiper shaft 12 and crank 13 are made as a one piece structural unit. A strip 50 is punched out from a sheet metal blank and bent into the shape shown. A part of the strip forms the crank 13, a substantially rectangularly projecting strip thereof serves as a metal support 51 for stiffening the wiper shaft 12. The part forming the crank 13 is coated wit an anticorrosive layer of plastics material. A ball pin 53 is integrally injection-molded onto crank 11. Plastic material is also injection-molded around metal support 51 to form the portions 20, 21 and 22 of the wiper shaft 12. The wiper shaft 12, the protective layer 52 and the ball pin 53 are preferably injection-molded in one working step and preferably from the same plastic material.

Cylindric portion 20 projects beyond the crank plane and terminates in a base 60 which is of relatively large diameter. Base 60 serves as a bracking surface for the fastening member 15 of the wiper arm 14 and because of its large surface high torques may be transmitted. The wiper is connected with the structural unit of wiper shaft and crank by screw 63 which co-operates with a thread 64 in the crank 13. Because base 60 and adjacent surface 61 of the fastening member are provided with fine teeth 62, the wiper arm will not twist relative to the wiper shaft and crank unit. Thus torque is directly transmitted from crank 13 onto the fastening member 15. The wiper shaft has no torque-transmitting function, but functions only as a guide. Because fastening member 15 rests upon a plastic surface and a certain resilience of the plastic material may occur, fastening member 15 is resiliently pressed against the base 60, by disc spring 65.

Screw 63 ends in a pocket bore 66 in the cylindric portion 20 of wiper shaft 12. The metal support 51 has a portion 67 extending laterally beside this pocket hole bore and is bent below the pocket bore 66 such that its lower portion is centrally positioned in the wiper shaft 12. The height of the cylindric portion 20 is adapted to the length of the pocket bore 66 in such a way that the metal support 51 reaches its central position approximately at the wider end area of the conical portion 21, whereby a sufficient wall thickness between the metal support 51 and the pocket bore 66 is ensured.

Bearing bushing 10 has a radially projecting supporting flange 70 in the area of the portion 30 with the largest diameter. Thereby reliable support of the bearing bushing on the body is achieved. The conical portion 31 begins directly below the body and is thereby closely positioned to the crank plane. This has a favorable effect on the operation of the unit.

A circumferential collar 71 is injection-molded onto the structural unit of the wiper shaft 12 and crank 13. Collar 71 encompasses the wall fo the bearing bushing 13 on the front side and thus forms a kind of labyrinth seal so that no impurities can penetrate into the bearing bush 13.

In the preferred embodiment the crank is fixed in a manner protected against twisting on that end of the wiper shaft which faces the wiper arm and the structural unit of crank and wiper shaft is mounted from outside the body. Insofar as other embodiments are to be mounted from the body interior, the bearing surface portions 21 or 31 may be arranged such that they conically taper towards the side of the wiper arm. Thereby the crank is again fixed onto the portion with the larger diameter with advantageously provides stability.

The present invention provides a wiper bearing for a windshield wiper system which can be simply produced at favorable costs and has outstanding running qualities even after a longer time in service.

What is claimed is:

1. A wiper system for motor vehicles, said system comprising: a wiper shaft, a wiper arm fixed to one end of said wiper shaft, a crank for-driving said wiper shaft and a plastic bearing bushing adapted to be fastened on the body of a motor vehicle, said bearing bushing having an axial bore encompassed by an axial wall having a substantially constant thickness over substantially all of its axial length, said wiper shaft being rotatably received in said bore, said bore having a conical bearing surface portion and said wiper shaft having a conical bearing surface portion complementary to and seated on the conical bearing surface portion complementary to bore, said wiper shaft having three portions with three different diameters and said bearing bushing having three portions with three different diameters, said bushing diameters accommodating the three different diameters of said wiper shaft.

2. A wiper system in accordance with claim 1, comprising:
spring means for urging said bearing bushing and said wiper shaft against each other in the axial direction relative to each other such that said conical bearing surface portion of said wiper shaft rests without play on said conical bearing surface portion of said bearing bushing.

3. A wiper system in accordance with claim 2, wherein:
the force exerted by said spring means is adjustable.

4. A wiper system in accordance with claim 3, wherein:
said spring means comprises a helical spring and a screw which is screwed into said wiper shaft, said helical spring being captured between said bearing bushing and the head of said screw.

5. A wiper system in accordance with claim 1, wherein:
said bearing surface portions taper in the manner of a cone towards said one end of said wiper shaft.

6. A wiper system accordance with claim 1, wherein:
said bearing surface portions widen in the manner of a cone towards said one end of said wiper shaft.

7. A wiper system in accordance with claim 1 wherein, comprising:
said crank being fixed to said wiper shaft in a manner protected against twisting on that side of the wiper shaft towards which the conical bearing surface portion widens.

8. A wiper system in accordance with claim 7, wherein:
said crank is fixed on said wiper shaft at said one end.

9. A wiper system in accordance with claim 7, wherein:
said crank and said wiper shaft are formed in one piece as a structural unit.

10. A wiper system in accordance with claim 9, wherein:
said wiper shaft is made of plastic material and is stiffened by a metal support which is made in one piece with said crank.

11. A wiper system in accordance with claim 10, wherein:
said crank and said metal support are made of a sheet metal and form a generally right angle relative to each other.

12. A wiper system in accordance with claim 10, wherein:
said crank is coated with an anticorrosive layer of plastic material.

13. A wiper system in accordance with claim 12, comprising:
a ball pin for articulating a push rod.

14. A wiper system in accordance with claim 10, wherein:
said wiper shaft has a cylindrical portion adjoining the side of said conical bearing surface portion, said cylindrical portion projecting beyond said crank and, said wiper system including a fastening member of a wiper arm directly braced against the base of said cylindrical portion.

15. A wiper system in accordance with claim 14, wherein:
said base of said cylindrical portion and the adjacent surface of said fastening member are provided with teeth.

16. A wiper system in accordance with claim 9, comprising:
a circumferential collar injection molded onto said structural unit, said circumferential collar overlapping the wall of said bearing bushing.

17. In a wiper system for motor vehicles, said system comprising a wiper shaft guided in a bearing bushing, the improvement wherein,
said bearing bushing and said wiper shaft each having conical bearing surface portions adapted to each other,
a crank for driving said wiper shaft, said crank being fixed to said wiper shaft in a manner protected against twisting on that side of the wiper shaft towards which the conical bearing surface portion widens,
said crank and said wiper shaft being a one piece structural unit, said wiper shaft being made of plastic material stiffened by a metal support made in one piece with said crank,
said wiper shaft having a cylindrical portion adjoining the side of said conical bearing surface portion, said cylindrical portion projecting beyond said crank,
a wiper arm fastening member directly braced against the base of said cylindrical portion, said base being provided with teeth, said fastening member being held on said wiper shaft and said crank by means of a screw, said screw cooperating with a thread in said metal support.

18. A wiper system in accordance with claim 17, wherein:
said fastening member is resiliently pressed against said base.

19. A wiper system in accordance with claim 17, wherein:
said screw ends in a pocket bore of said wiper shaft and that said metal support has a first portion extending laterally beside the said pocket bore and adjacent thereto and a second portion centrally positioned in said wiper shaft.

* * * * *